Patented Apr. 28, 1953

2,636,816

UNITED STATES PATENT OFFICE 2,636,816

BETA-HALO PROPIONIC ACIDS AND DERIVATIVES AS PLANT GROWTH REGULANTS

William D. Stewart, Yonkers, N. Y., assignor to The B. F. Goodrich Company, New York, N. Y., a corporation of New York No Drawing. Application December 3, 1947, Serial No. 789,561

19 Claims. (Cl. 71—2.7)

1

This invention relates to the regulation of plant growth and to synthetic compositions which produce histogenic and morphogenic changes in living plants. It pertains, more specifically, to the use of certain derivatives of propionic acid in altering the growth characteristics of plants.

The art of controlled modification of plant growth by the application of synthetic growth regulants has aroused considerable interest in recent years. Many materials have been discovered which when applied to plant structure in minute amounts act as growth regulants. For example, chemical compounds have been found which stimulate and initiate root growth, which stimulate the growth of the abscission cells of fruit stems, which, at increased dosages, retard the growth of the abscission cells of fruit stems, which stimulate stem bud growth, which stimulate seed germination, which promote callus formation, and which function in similar ways as evocators of plant histogenesis and morphogenesis.

Among the known synthetic plant growth regulants are for example, indoleacetic acid, indolebutyric acid, indolepyruvic acid, naphthalene acetic acid, naphthalene butyric acid, phenyl acetic acid, 2,4-dichlorophenoxy acetic acid, naphthalene glycolic acid and others. While these materials have been widely used they have not been completely satisfactory and hence there is a great need in the art of plant propagation for improved growth regulants. The known regulants and growth initiators are less effective than is desired in various aspects of plant propagation, for example, in the rooting of fruit tree cuttings to propagate desirable somatic characteristics of plants which cannot be transferred by the use of seed, in increasing the percentage of rooted cuttings of those plants now normally produced from cuttings instead of seed, in reducing the number of set fruit on heavy bearing fruit trees, in producing higher setting of fruit on light setting trees and bushes, in preventing the premature fall of fruit and in producing seedless or near seedless fruits by inducing parthenogenesis.

Moreover, few of the known plant growth regulants can be synthesized on factory production scale so as to be either available in large enough quantities to supply the demand or sufficiently low in price to attract the attention of prospective users. Also, those which are available in sufficient quantity and at a marketable price to make their use economically feasible do not have as wide a range of tolerance of application as is

2 desirable, for the difference between the effective concentration and that which causes undesirable injury to the plant is relatively small in many instances. Consequently, the use of many of the regulants that are now available not only requires the attention of a highly skilled technically trained supervisor during application of the materials but also requires the precise measuring of small quantities in the field with precision usually available only in the chemical laboratory. Accordingly, the precision and supervision required to employ successfully the available regulants and to achieve the maximum benefits of their use often prevent large scale field application by the average prospective user.

I have discovered a class of growth regulants which are exceedingly valuable in the art of plant propagation for altering the growth characteristics of plants and which are capable of being successfully applied by the average person possessing no special skill. The materials which I have found to possess these properties are beta-halo propionic acids and the esters, salts and amides of these halo propionic acids. These materials function as evocators of histogenesis and morphogenesis in diverse manners to alter the growth characteristics of many types of plants.

The preferred compounds of this new class of growth regulants are those which have the following general formula:

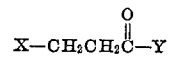

where X is a halogen atom and Y is the hydroxyl radical (in which event the compound is an acid), an oxyhydrocarbon radical (in which event the compound is an ester), an amido or hydrocarbon-substituted amido radical (in which event the compound is an amide) or an oxyammonium or oxymetallic group (in which event the compound is a salt). More specifically, Y may be the hydroxyl group or such oxyhydrocarbon groups as alkoxy, alkenoxy, cycloalkoxy, aryloxy, alkaryloxy, aralkoxy or the like, or an amido, or hydrocarbon-substituted amido radical where one or both of the hydrogens is replaced by alkyl, alkenyl, aryl, aralkyl, alkaryl, etc., or an oxyammonium group (—O—NH₄) or an oxymetallic group of the formula —O—M where M is a metal such as sodium, potassium, magnesium, zinc, iron or the like. All the propionic acid derivatives in the above class (where Y is not OH) are capable of being converted to the free acid through hydrolysis involving one molecule of water.

These compounds can be readily and economically prepared by numerous methods known to the art of chemical synthesis as is specifically disclosed and discussed in prior patents and in the literature.

Beta-halo propionic acids which are useful according to my invention include beta-chloropropionic acid, beta-bromopropionic acid and beta-iodopropionic acid. Such salts of these acids as sodium beta-chloropropionate, potassium beta-bromopropionate, zinc beta-chloropropionate, ammonium beta-bromopropionate, magnesium beta-chloropropionate, and the like can also be employed according to my invention. Esters of the above beta-halo propionic acids which are useful growth regulants according to this invention include such alkyl esters as the methyl, ethyl, n-propyl, isopropyl, n-butyl, isobutyl, tertiary butyl, amyl, hexyl and dodecyl esters and the like; such aryl esters as phenyl, naphthyl and tolyl esters and the like; such aralkyl esters as the benzyl, phenethyl, and the like; such unsaturated aliphatic esters as the allyl, methallyl, 3-methyl-3-hexenyl, 2-methyl-1-butenyl, and the like; and such alicyclic esters as the cyclohexyl esters and others.

Other beta-halo propionic acid derivatives which are useful growth regulants are the amides of any of the above acids, such as for example the unsubstituted amides, mono- and di-methyl amides, mono- and di-ethyl amides, mono- and di-butyl amides, mono- and diisobutyl amides, mono- and di-isopropyl amides, mono- and di-cyclohexyl amides, mono- and di-benzyl amides, mono- and di-phenethyl amides, mono- and di-phenyl amides, as well as such mixed amides as the methyl phenyl amides, and ethyl phenyl amides and the like.

The compounds of this invention may be employed in numerous ways to stimulate or modify the growth characteristics of plant structures. For example, they may be applied to seeds to stimulate germination or to stimulate root and stem development; they may be applied to tubers to promote root development and stem bud growth; they may be applied to cuttings and transplants to stimulate root formation, or they may be applied to blossoms to induce parthenogenesis. Also, they may be applied to intact plants to retard blossoming, to stimulate the growth of abscission cells to produce premature dropping of blossoms and set fruit, or by varying the manner of treatment may also modify the growth of abscission cells to prevent drop of mature fruit. Thus, these compounds may be capable of producing a variety of desirous modifications of plant growth which are exceedingly useful and beneficial to the operators of greenhouses, orchards and nurseries.

In the application of these compounds to produce these growth modifications different compositions may be employed. In general, aqueous dispersions or aqueous solutions depending on whether or not the compound is water-soluble will be found most desirable. The dispersions will of course contain a dispersing or wetting agent and the solutions also preferably contain wetting agents to facilitate the spreading of the solution. Such wetting and dispersing agents may be used as, for example, those typified by the following general classifications: sodium and potassium salts of fatty acids known as soft and hard soaps; salts of disproportionated abietic acid known as rosin soaps; salts of the hydroxy aldehyde acids present in seaweed known as algin soaps; alkali-casein compositions; water-soluble lignin sulfonate salts; long chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having 8 to 20 carbon atoms in the alkyl group; water-soluble aryl sulfonates; water-soluble alkyl aryl sulfonates; water-soluble aralkyl sulfonates; water-soluble sorbitan mono-laurate, palmitate, stearate and oleate; and others. These dispersing and wetting agents are sold under numerous trade names and may be either pure compounds or mixtures of compounds of the same general group. The aqueous dispersions and solutions may also contain adhesives or stickers to prevent the removal of the stimuli by weathering. A material which will function as an excellent sticker or adhesive and may be employed advantageously is an aqueous dispersion of a polymeric organic polysulfide which on drying forms a discontinuous, translucent, rubbery, microscopic film. An example of this type of sticker is the aqueous dispersion of polymeric ethylene polysulfide prepared by reacting ethylene dichloride with an aqueous alkali polysulfide solution in the presence of a salt-stable emulsifying agent.

The compounds may also be applied in admixture with other diluents either as solutions, dispersions, pastes or dusts. The solutions, dispersions and pastes may be prepared with any inert liquid vehicle while the dusts are usually prepared with some finely-divided inert, solid material such as talc, flour, fuller's earth, clay or other pulverulent materials, soluble or insoluble in water.

In all their various applications, these plant growth modifying or stimulating compositions are applied to plant structures which are capable of growth, i. e., plant structures containing growing cells and such plant structures containing dormant cells as tubers and seeds. In the application of these growth regulants to tubers and seeds, it is not known whether the action of the material is to modify the tuber or seed or to alter the growth characteristics of the plant which results from the tuber or seed. For the purposes of this invention, it is intended that the use of the term "plant" includes the dormant as well as growing plants.

The following examples illustrate the ability of these compositions to stimulate the growth of various plant structures and further illustrate the numerous compositions in which these compounds can be successfully employed. In many of the examples, the results obtained from the use of indolebutyric acid, a growth promoting material which has enjoyed considerable commercial success, are given merely for purposes of comparison.

EXAMPLE I

In an assay to determine the growth promoting activity of members of the class of beta-halo propionic acids and their derivatives hereinbefore defined, about 0.05 gram of each of the materials listed in Table I below were mixed with one gram portions of lanolin. Some of the mixture was rubbed on petioles and some on the stems of young tomato plants. The treated plants were observed over a period of several days for nastic curvature and morphogenic changes. This is a well-known method for the determination of the index of activity of plant stimulating substances. The results of this assay together with the use of indolebutyric acid in the same manner, and the results of the use of lanolin alone as a check are listed in Table I.

Table I
STIMULANT ACTIVITY ON YOUNG TOMATO PLANTS

| Material Employed | Response 72 hours after treatment |
|---|---|
| Beta-chloropropionic acid | Injury.[1] |
| n-Butyl beta-chloropropionate | Do.[1] |
| Ethyl beta-bromopropionate | Do.[1] |
| Beta-bromopropionic acid | Epinastic response on opposite leaf. |
| Indolebutyric acid | Good epinastic curvature. |
| Lanolin alone for control | None. |

[1] Concentration of these materials obviously too high. A lesser amount per gram of lanolin produces strong epinastic response with no injury.

The following examples illustrate the practical value of the stimulant activity of these propionic acid derivatives.

EXAMPLE II

Three inch terminal cuttings of chrysanthemum, variety Mary L. Hall, were partially immersed for 30 seconds in aqueous solutions containing members of the class of beta-halo propionic acids and their derivatives defined above. The treated portion of the cuttings was stuck in wet sterilized sand and the cuttings were watered daily. After eleven days the cuttings were carefully removed from the sand and inspected for rooting. The results of these bench rooting trials are shown in Table II below. The aqueous solutions employed in these tests were prepared by dissolving a quantity of the growth regulant sufficient to give the concentration desired, in an aqueous solution consisting of 0.025% by weight of sodium lauryl sulfate as a wetting agent to insure good contact with the stem portion to be treated. The results shown in Table II are illustrative of the typical results for this new class of growth regulants.

Table II
ROOTING INITIATION OF CHRYSANTHEMUM CUTTINGS

| Material Employed | Concentration, grams per liter | Variety Mary L. Hall, Response 11 days after treatment |
|---|---|---|
| Aqueous solution sodium lauryl sulfate (0.025%). | | No rooting—Poorly callused. |
| Propyl beta-chloropropionate. | 1.0 | 100% of the cuttings heavily rooted and uniformly callused. |
| | 0.50 | |
| | 0.25 | |
| N,N-Diethyl beta-chloropropionamide. | 1.0 | 100% heavily rooted; uniformly callused. |
| | 0.50 | 90% rooted. All uniformly callused. |
| | 0.25 | 80% rooted. All uniformly callused. |
| 2-Ethyl hexyl beta-chloropropionate. | 0.50 | 90% rooted. All uniformly callused. |
| Ethyl beta-bromopropionate. | 0.125 | 70% rooted. All uniformly callused. |

Chrysanthemum cuttings were also treated with an aqueous dispersion of 0.2 gram/liter of indolebutyric acid and subjected to bench rooting trials as described above. About 90% of these cuttings had some root growth but most of the rooting was very light. Cuttings treated with water alone will root in 4 to 6 weeks in the usual bench rooting conditions, but only 50% of these subjected to the process will root and even then those that root are irregularly callused. It is extremely important that a high percentage of the cuttings become uniformly callused at the cut surface for the callus layers prevent the entrance of microorganisms into the cut which will cause the cuttings to rot during bench rooting. The callus formation is generally slow and in most cases is not complete when cuttings have begun to root. Thus, a composition which stimulates root growth and also stimulates cell growth to bring about rapid and uniform callus formation has exceptional utility.

EXAMPLE III

Separate lots of four inch terminal cuttings of Yew (Taxus) were partially immersed for 30 seconds in aqueous solutions containing (1) 0.5 gram of propyl beta-chloropropionate per liter, (2) 1.0 gram of N,N-diethyl beta-chloropropionamide per liter, and (3) 0.5 gram of indolebutyric acid per liter. The treated cuttings were stuck in moist sterilized sand and cared for in the usual manner. The cuttings so treated were carefully removed from the sand 61 days after the application of the growth stimulants and were examined both for root development and for callus growth. It was discovered that 50% of the cuttings treated with propyl beta-chloropropinoate had rooted and 40% of the cuttings treated with N,N-diethyl beta-chloropropionamide had rooted. All of these cuttings had uniformly callused even though they had not all rooted. At the same time none of the cuttings treated with indolebutyric acid had rooted and only a few of the cuttings had uniformly callused.

EXAMPLE IV

Three inch terminal cuttings of daisy were partially immersed in an aqueous solution containing 0.125 gram of ethyl beta-bromopropionate per liter. The treated portion of the cuttings was stuck in moist sterilized sand and cared for in the usual manner. After 11 days in the sand bed, the cuttings were carefully removed and inspected. It was observed that 40% of the cuttings had rooted and all cuttings so treated were uniformly callused. Cuttings immersed in water and subjected to bench rooting trials will root in about 5 weeks. Thus, the treatment with ethyl beta-bromopropionate accelerates rooting and produces new independent plants in a very short time.

These growth regulants have numerous other uses. For example, these materials may be employed in concentrations of from about 10 to about 30 parts per million in spray compositions for fruit trees to reduce the number of set fruit. This may be accomplished by spraying the composition on fruit trees during full bloom. The spray compositions containing beta-halo propionic acids and their derivatives are believed to accomplish the thinning by stimulating the growth of the abscission cells of the blossom stem by the hormone-like activity of these compounds. The thinning of fruit blossoms is extremely desirous for fruit trees which normally have a heavy fruit set either because of self-pollenation or otherwise; for, if the set fruit is heavy, the tree will bear only periodically, usually every other year and the years of heavy production not only results in a large quantity of small or undersized fruit but also results in limb damage because of the excess weight of the fruit. Orchard operators have attempted to overcome this heavy setting of fruit by hand thinning of the set fruit which is not only slow but relatively expensive. Thus, the premature removal of some of the blossoms by the application of a small amount of a non-toxic material is quite desirable.

Seeds and tubers may also be treated with aqueous solutions or dusts containing beta-halo propionic acids or their derivatives to improve the root system of the resulting plants. For example, when such materials as beta-chloropropionamide, cyclohexyl beta-chloropropionate, benzyl beta-bromopropionate and beta-chloropropionanilide in concentrations as low as 0.125 gram per liter to about one gram per liter or higher (in aqueous compositions) or 0.01% to about 0.1% or higher (in dusts), are applied to seeds and tubers, the root system of the resulting plants are much more prolific than those resulting from untreated seeds and tubers. A further example of the utility of these growth stimulants is illustrated by the ability of these materials to initiate root growth of plants after transplanting. Plants whose roots have been dipped into aqueous solutions of the regulants or in dusts prepared by incorporating the evocator with diatomaceous earths, talc, dry ordinary soil, and the like, and planted in the usual manner, produce a more prolific root system in less time than untreated plants and consequently are not set back in growing to the same degree as untreated plants.

The use of these growth stimulants in concentrations above about 20 grams per liter or in excess of about 2% by weight sometimes produces severe injury to the plant structure. When the concentration of the stimulant in the treating composition is as high as 5% or more by weight, the injury, in many instances, may be so severe as to cause the death of the plants treated. This result is highly desirable in many instances as in weed killing. Just how these materials cause the ultimate death of the plants is not completely understood, but it is believed that the presence of the greater amount of the plant regulants alters the metabolic processes of the plant so that the dominance of either anabolic or catabolic processes may lead to the death of the plant.

Although the major portion of the description of the utility of these beta-halo propionic acids and derivatives of these acids has been directed to the altering of the growth characteristics of portions of the plant structure in such a manner as to promote the propagation of plants, it is not intended that the invention shall be so limited, for, as stated above, the materials may be employed to alter the physiology of the plant in such a manner as to kill the plants. In both cases the application of these materials alters the growth characteristics of the plants. Accordingly, the effect that these materials have on plants will be referred to in the appended claims as "altering the growth characteristics" of plants.

In the above examples, the concentration of the active ingredients in the compositions which were employed as growth stimulants was in the range of 0.001% to about 0.1% by weight. Although these concentrations are considered the optimum concentrations for the purposes for which they were used, the concentration of the active ingredient can be varied from about 0.001% to about 1% for growth stimulation without any deleterious effects and can be as high as 10% when the composition is used for weed killing. Thus, these growth stimulants have a wide range of tolerance in their application and can be safely employed without any special technical skill.

The effectiveness of the compounds of this invention will vary according to their individual characteristics, according to the type of plant structure treated and according to the purpose of the treatment. For example, a different concentration may be required for one variety of plant than required for another and the concentration required for root initiation may be different from that required for root stimulation. Also, the concentration required for antidrop treatment, while generally similar, may not be the same as that required to produce parthenogenesis. Those skilled in the art having these factors in mind and noting the results of the above examples and the tendencies indicated therein, will be able to determine conditions most suitable in any given case. In any instance the concentration required to achieve the desired results will fall within the range of concentrations given above.

To those skilled in the art many widely differing embodiments of the invention may become apparent. Accordingly, although I have disclosed specific examples of the utility of specific members of this new class of growth regulants, I do not thereby desire or intend to limit myself solely thereto, for as previously stated the vehicle and the amount of regulant employed may be varied and other materials of the class having equivalent physiological properties may be employed if desired without departing from the spirit and scope of the invention as defined in the appended claims.

I claim:

1. The method of stimulating plant root growth which comprises applying to the plant structure to be planted before the planting thereof a composition comprising as the essential active ingredient about 0.0001% to about 0.1% by weight of beta-chloropropionic acid uniformly associated with an aqueous solution of a surface-active agent.

2. The method of stimulating plant root growth which comprises applying to the plant structure to be planted before the planting thereof a composition comprising as the essential active ingredient about 0.0001% to about 0.1% by weight of propyl beta-chloropropionate uniformly associated with an aqueous solution of a surface-active agent.

3. The method of stimulating plant root growth which comprises applying to the plant structure to be planted before the planting thereof a composition comprising as the essential active ingredient about 0.0001% to about 0.1% by weight of N,N - diethyl beta - chloropropionamide uniformly associated with an aqueous solution of a surface-active agent.

4. A composition for stimulating plant root growth which comprises as the essential active ingredient about 0.0001% to about 0.1% by weight of a beta-halo propionic acid dispersed in an aqueous solution of a surface-active agent.

5. A composition for stimulating plant root growth which comprises as the essential active ingredient about 0.0001% to about 0.1% by weight of a beta-halo propionamide dispersed in an aqueous solution of a surface-active agent.

6. A composition for stimulating plant root growth which comprises as the essential active ingredient about 0.0001% to about 0.1% by weight of a hydrocarbon ester of a beta-halo propionic acid dispersed in an aqueous solution of a surface-active agent.

7. A composition for stimulating plant root growth which comprises as the essential active ingredient about 0.0001% to about 0.1% by weight of beta-chloropropionic acid dispersed in an aqueous solution of a surface-active agent.

8. A composition for stimulating plant root growth which comprises as the essential active ingredient about 0.0001% to about 0.1% by weight of N,N-diethyl beta-chloropropionamide dispersed in an aqueous solution of a surface-active agent.

9. A composition for stimulating plant root growth which comprises as the essential active ingredient about 0.0001% to about 0.1% by weight of propyl beta-chloropropionate dispersed in an aqueous solution of a surface-active agent.

10. The method of altering the growth characteristics of plants which comprises applying to the plant structure a composition made up of an essential active ingredient uniformly associated with an inert diluent as a carrier therefor, the essential active ingredient being present in a concentration of about 0.001% to 5% by weight and being a compound selected from the class consisting of acids having the formula $$X-CH_2CH_2COOH$$

where X is a halogen atom, and derivatives thereof capable of being converted to the free acid through hydrolysis involving one molecule of water.

11. The method of claim 10 where the active ingredient is a beta-halo propionic acid and the inert diluent carrier is an aqueous solution of a surface-active agent.

12. The method of claim 10 where the active ingredient is a beta-halo propionamide and the inert diluent carrier is an aqueous solution of a surface-active agent.

13. The method of claim 10 where the active ingredient is a hydrocarbon ester of a beta-halo propionic acid and the inert diluent carrier is an aqueous solution of a surface-active agent.

14. The method of stimulating plant root growth which comprises applying to plant structures to be planted before the planting thereof a composition made up of an essential active ingredient uniformly associated with an inert diluent as a carrier therefor, the essential active ingredient being present in a concentration of about 0.001% to 0.1% by weight and being a compound selected from the class consisting of acids having the formula $$X-CH_2CH_2COOH$$

where X is a halogen atom, and derivatives thereof capable of being converted to the free acid through hydrolysis involving one molecule of water.

15. A composition for altering the growth characteristics of plants comprising as the essential active ingredient about 0.0001% to about 5% by weight of a compound selected from the class of acids of the formula $$X-CH_2CH_2-\overset{O}{\underset{\|}{C}}-OH$$

where X is a halogen atom and derivatives thereof capable of being converted to the free acid through hydrolysis involving one molecule of water, and also comprising, as a carrier therefor, an inert finely-divided pulverulent solid.

16. A composition for altering the growth characteristics of plants comprising as the essential active ingredient about 0.0001% to about 5% by weight of a compound selected from the class of acids of the formula $$X-CH_2CH_2-\overset{O}{\underset{\|}{C}}-OH$$

where X is a halogen atom and the derivatives thereof capable of being converted to the free acid through hydrolysis involving one molecule of water, and also comprising, as a carrier therefor, an aqueous solution of a surface-active agent.

17. A composition for stimulating plant root growth comprising as the essential active ingredient about 0.0001% to 0.1% by weight of a compound selected from the acids having the formula $$X-CH_2CH_2-\overset{O}{\underset{\|}{C}}-OH$$

where X is a halogen atom and derivatives thereof capable of being converted to the free acid through hydrolysis involving one mole of water, and also comprising, as a carrier therefor, an inert finely-divided pulverulent solid.

18. A composition for stimulating plant root growth comprising as the essential active ingredient about 0.0001% to 0.1% by weight of a compound selected from the acids having the formula $$X-CH_2CH_2-\overset{O}{\underset{\|}{C}}-OH$$

where X is a halogen atom and derivatives thereof capable of being converted to the free acid through hydrolysis involving one mole of water, and also comprising, as a carrier therefor, an aqueous solution of a surface-active agent.

19. A method for the killing of undesired plants which comprises applying to the plants a compound selected from the group consisting of monohalopropionic acids of the formula $$X-CH_2CH_2COOH$$

wherein X represents one of the halogens chlorine, bromine and iodine and their water-soluble salts, such compound being employed at a dosage sufficient to kill the plants concerned.

WILLIAM D. STEWART.

References Cited in the file of this patent

Thorpe: Dictionary of Applied Chemistry, vol. 7, published 1921, pages 455 and 456, article on Weed Killers.

Beilstein: Handbuch der organischen Chemie, fourth edition, published 1920, vol. 2, pp. 249 and 250.

Beilstein: Handbuch der organischen Chemie, page 111 of first supplement (published 1929) to vol. 2, System No. 162.

Handbook of Chemistry and Physics, 28th edition (1944), pages 974 and 975.

Mouren: Annales der Chemie et de Physique, 7th series, volume 2, pp. 170 to 172 (1894).